United States Patent [19]

Bragg et al.

[11] Patent Number: 5,490,940
[45] Date of Patent: Feb. 13, 1996

[54] METHOD FOR FORMING MINERAL SOLIDS-OIL FLOCCULES

[75] Inventors: James R. Bragg; Shan H. Yang, both of Houston, Tex.

[73] Assignee: Exxon Production Research Company, Houston, Tex.

[21] Appl. No.: 225,122

[22] Filed: Apr. 8, 1994

[51] Int. Cl.$^6$ ............................................. C02F 1/28
[52] U.S. Cl. ........................... 210/671; 134/7; 210/691; 210/924
[58] Field of Search ..................... 210/671, 680, 210/691, 708, 730, 924, 925; 134/7

[56] References Cited

U.S. PATENT DOCUMENTS

| | | | |
|---|---|---|---|
| 705,253 | 7/1902 | Krause . | |
| 2,367,384 | 1/1945 | Tymstra et al. | 210/680 |
| 3,634,227 | 1/1972 | Patterson | 210/11 |
| 3,732,162 | 5/1973 | McCoy et al. | 210/40 |
| 3,948,770 | 4/1976 | Goodrich et al. | 210/40 |
| 4,226,711 | 10/1980 | Meneghetti et al. | 210/691 |
| 4,297,122 | 10/1981 | Wallace | 71/12 |
| 4,497,688 | 2/1985 | Schaefer | 162/181.1 |
| 5,035,804 | 7/1991 | Stowe | 210/671 |
| 5,039,414 | 8/1991 | Mueller et al. | 210/924 |
| 5,118,425 | 6/1992 | Campbell | 210/691 |
| 5,176,831 | 1/1993 | Rowsell | 210/631 |

OTHER PUBLICATIONS

"Adsorption and Desorption of Clay Particles at the Oil–Water Interface", N. Yan and J. H. Masliyah, Journal of Colloid and Interface Science, v. 168, Dec. 1994, pp. 386–392.

"Clay–Oil Flocculation and its Effect on the Rate of Natural Cleansing in Prince William Sound Following the Exxon Valdez Oil Spill"; Third ASTM Symposium on Environmental Toxicology and Risk Assessment: Aquatic, Plant, and Terrestrial, Apr. 25–26, 1993, Atlanta, Georgia. Publisher: Exxon.

*Primary Examiner*—Ivars Cintins
*Attorney, Agent, or Firm*—K. D. Van Tassel

[57] ABSTRACT

A method is disclosed for removing spilled oil from shorelines, other solid surfaces, or from the surface of a body of water by adding to the surface a mixture of fine hydrophilic mineral solids dispersed in an aqueous liquid that interacts with the oil to form buoyant mineral fines-oil floccules. These floccules reduce the tendency of the oil to adhere to solid surfaces or to recoalesce, thus facilitating dispersion and removal of the oil.

19 Claims, 4 Drawing Sheets

METHOD FOR FORMING MINERAL SOLIDS-OIL FLOCCULES

FIELD OF THE INVENTION

This invention relates to a method for removing oil from a variety of surfaces including but not limited to water, rock, or a solid substrate. More particularly, the invention pertains to method for forming substantially buoyant mineral solids-oil floccules to facilitate removing the oil from such surfaces.

BACKGROUND OF THE INVENTION

The problem of removing oil from water and rock surfaces is complicated by a need for an effective oil removal method which has no perceived detrimental environmental effects. For example, certain surfactants are quite effective at dispersing slicks of oil on a body of water. Other surfactants could be effective for washing spilled oil from affected marine shorelines. However, there is signifcant controversy around the use of such surfactants because they are considered by some persons to be potentially toxic to the environment. In particular, their use on shorelines or in shallow, protected embayments has been restricted. This perception of potentially toxic environmental effects associated with the use of surfactants frequently creates hesistancy among some emergency response groups to use them promptly or in sufficient concentration. As a result, a surfactant's effectiveness is often diminished because it was not applied in a timely manner or in sufficient concentration.

Consequently, an effective oil-spill remediation method using non-toxic, naturally occurring materials is a desirable alternative. Such a method should remediate the affected area relatively quickly while minimizing disruption to the surrounding environment or ecosystem. Naturally occurring mineral particles have often been proposed for use in absorbing oil from water in lieu of 0 use of surfactants for dispersing the oil where the perceived environmental risk of applying surfactants appears to outweigh the remediation benefit of such surfactants.

It is well known among those skilled in the art that oil may be absorbed or coagulated on a water surface using some absorbent mixture to produce an oil agglomeration. U.S. Pat. No. 705,253 claims a class of magnesium containing minerals such as magnesite, dolomite, olivine, and chrysotile asbestos for attracting and adsorbing oil from an oil-water mixture and causing the oil-mineral body to settle. U.S. Pat. No. 3,634,227 claims using clay as an oil absorbent which is sufficiently subdivided for ensuring that the oil-bearing clay will float until an emulsifier is added for causing it to sink. After the oil-bearing clay is emulsified, naturally occuring bacteria and/or enzymes in the water will digest the oil in the clay. If the emulsifier is not added, however, the oil-bearing clay remains agglomerated on the water surface and the bacteria and/or enzymes cannot effectively digest the oil in the clay. As a result, the oil-bearing clay must be skimmed from the water surface using conventional skimming techniques. U.S. Pat. No. 3,732,162 claims a coagulant mixture containing powdered wax and an anti-caking agent which causes the oil on the surface of water to coagulate and form a floating, semi-solid mass. Similarly, such a mass must be removed from the water surface using equipment, such as a perforated boom, because the mass cannot be effectively digested by bacteria and/or enzymes present in the water. Such oil agglomerations, however, may pose a threat to certain marine wildlife which penetrate the water surface covered with the oil agglomeration. When the animal penetrates the surface it may become exposed to quantities of oil which could be either debilitating or fatal depending on the amount of oil covering the animal.

Floccule formation of mineral particles with oil in seawater is also well known among those skilled in the art. In flocculation, fine mineral particles interact with fine oil droplets in the presence of water to form colloidal structures that can either float or sink. What has not been determined to this point is how to control the formation of floccules so that they are produced over a relatively short time period (i.e., over several minutes to days) and remain substantially buoyant. A substantially buoyant floccule is instrumental in facilitating removal of mineral solids-oil floccules from the surface being treated. Flocculents typically have been used for removing finely dispersed oil from water by producing a precipitate or a floccule which ultimately settles to the bottom of the body of water. U.S. Pat. No. 3,948,770, for example, claims a flocculant mixture comprising sodium or calcium montmorillonite clay with an anionic polyelectrolyte which agglomerates oil droplets in seawater and thereby causes them to settle.

In a paper entitled "Clay-Oil Flocculation and Its Effect on the Rate of Natural Cleansing in Prince William Sound Following the Exxon Valdez Oil Spill", presented at Atlanta, Ga. on Apr. 25, 1993 to the third ASTM Symposium on Environmental Toxicology and Risk Assessment: Aquatic, Plant, and Terrestrial, J. R. Bragg and S. H. Yang disclose the formation of substantially buoyant mineral solids-oil floccules by natural interactions of fine hydrophilic mineral particles with oil and seawater. The paper describes how a naturally occurring process known as clay-oil flocculation forms solids-stabilized emulsions. Such emuslions enhanced the rate of natural cleansing of residue oil from shoreline sediments in Prince William Sound. However, the natural cleansing process slowly occurred over a period of months because the emulsion formation rate was limited by available minerals and their particle size distributions, and by tidal energies naturally occurring in the region.

Consequently, a need exists for a method of forming substantially buoyant floccules from oil and a naturally occurring, non-toxic material in a relatively short time period. More specifically, a need exists for a method of forming substantially buoyant mineral solids-oil floccules in a relatively short time period which (1) permit rapid, safe removal of oil residues from surfaces of marine shoreline sediments or other solids, (2) permit the removal of oil from water surfaces either in situ, where such floccules can be digested by naturally occurring bacteria and/or enzymes, or by conventionl mechanical techniques where oil recovery is desired, and (3) transforms the oil to a form that presents a reduced threat to marine wildlife that may penetrate the water's surface.

SUMMARY OF THE INVENTION

According to the invention there is provided a method for forming substantially buoyant mineral solids-oil floccules from oil, hydrophilic mineral solid particles, and an aqueous liquid having sufficient ionic strength which will allow formation of substantially buoyant mineral solids-oil floccules. The method comprises, (a) dispersing the mineral solid particles in the aqueous liquid so that they remain substantially hydrophilic; (b) allowing discrete oil droplets to form from the oil; and (c) contacting the oil droplets with the mineral solid particles in the presence of the aqueous liquid whereby substantially buyouant mineral solids-oil floccules are formed.

The method may used to treat a variety of surfaces, either before or after the surface has become affected by oil, for removing the mineral solids-oil floccules from or dispersing them over such surfaces. Types of surfaces which can be treated with the method include a solid surface, a seawater surface, or fresh water surface.

BRIEF DESCRIPTION OF THE DRAWINGS

In order to more fully understand the following detailed description of the invention, reference should be made to the appended drawings. The appended drawings represent only two embodiments of many possible applications of the present invention. These drawings are not to be considered limiting as the invention may admit to other equally effective embodiments and useful applications for forming substantially buoyant mineral solids-oil floccules from oil, hydrophilic mineral solid particles, and water.

DETAILED DESCRIPTION OF PREFERRED EMBODIMENTS

Introduction

Figure 1:
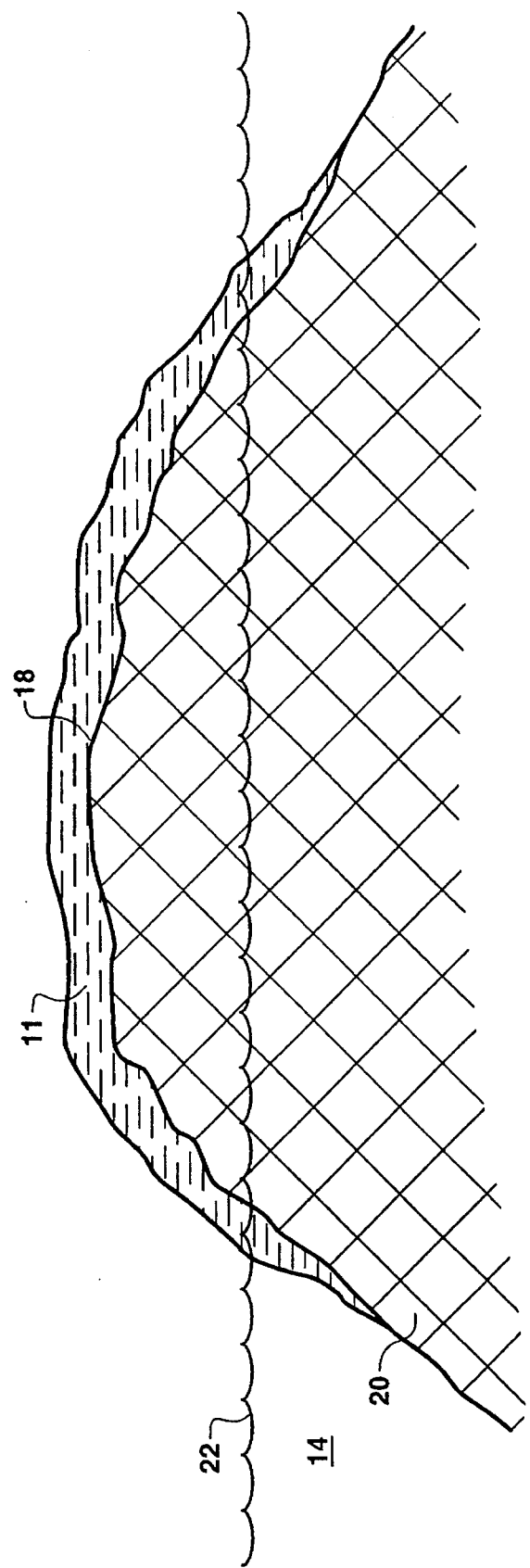
FIG. 1 illustrates a cross sectional view of a single shoreline rock at low tide covered with an oil film on its surface.

The invention described herein is a method for safely removing oil from a variety of surfaces including but not limited to a rock surface or water surface. For example, a rocky shoreline, typically comprising rock, gravel, sand, and mixtures thereof, can be remediated using the present invention. Also, a variety of water surfaces can be treated with the present invention to facilitate the oil's dispersion or removal. Such surfaces may include, but are not limited to, ocean, lake, river,or estuary surfaces. Types of oil which can be effectively removed or dispersed using the present invention include, but are not limited to, crude oil, fuel oil, and any other hydrocarbon, whether natural or synthetic, containing one or more polar compounds.

In the case of remediating shorelines, the process is adaptable to capturing and recovering the oil if such recovery is justified based on the amount of oil involved and the extent of adverse environmental effects, if any, that might arise out of the oil's presence. In applying the proposed method to oil on a water surface, the method promotes a natural dispersion and dilution of the oil and thereby enhances the oil's weathering and natural biodegradation rate. Consequently, if the oil may have any toxic environmental effects the inventive method accelerates the rate at which such toxic effects are reduced or eliminated.

Mechanistic Description of the Flocculation Process

Whether the inventive method is used to treat oil on either solid or water surfaces, the oil is removed or dispersed from the surface in the form of substantially buoyant floccules formed by interactions among hydrophilic mineral solid particles (also known as mineral fines), oil, and water. The claimed method requires that the water have sufficient ionic strength to allow flocculation to occur, and that the oil contain a sufficient concentration of one or more polar hydrocarbon compounds to cause flocculation with the electrically charged surfaces of the mineral particles. For convenience and brevity of the discussion below, this flocculation process will be referred to as the "clay-oil flocculation" process and the floccules produced from such a process as "clay-oil floccules". It is to be understood, however, that many hydrophilic mineral solid particles, including but not limited to clay, quartz, and feldspar, will facilitate this process so long as the particles are sufficiently small in size. The mineral particles should have a mean diameter of about 10 microns or less, and preferably a mean diameter of about 2 microns or less.

Clay-oil flocculation consists of four fundamental steps. First, mineral fines with an average mean diameter of about 10 microns or less are dispersed in a liquid preferably comprising water. Second, an oiled surface is contacted with the liquid having (1) the lo dispersed hydrophilic mineral fines and (2) sufficient ionic strength to allow formation of substantially buoyant mineral solids-oil floccules in water. Third, discrete oil droplets are formed. Fourth, substantially buoyant mineral solids-oil floccules are formed from the oil droplets in the presence of the liquid having the mineral fines and sufficient ionic strength to allow formation of the floccules. The formation of oil droplets can be enhanced and accelerated by spraying the mixture of liquid and hydrophilic mineral fines on the oiled surface at a sufficiently high pressure to facilitate droplet formation.

FIG. 1 illustrates a cross sectional view of a single shoreline rock 20 at low tide covered with an oil film 11 on its surface 18. For purposes of illustration only a single rock 20 is depicted, but the same clay-oil flocculation process applies when the oiled shoreline is comprised of numerous oiled sediments, large or small. Prior to treatment of the rock 20 with the clay-oil flocculation process the oil film 11 is on the rock's surface 18 and may drop below the water's surface 22. The oil film 11 on the rock 20 remains relatively resistant to the washing action produced from tidal action of the water 14 . For a typical oil spill, the thickness of the oil film 11 requiring treatment may range from about 5 microns to about several centimeters.

Figure 2:
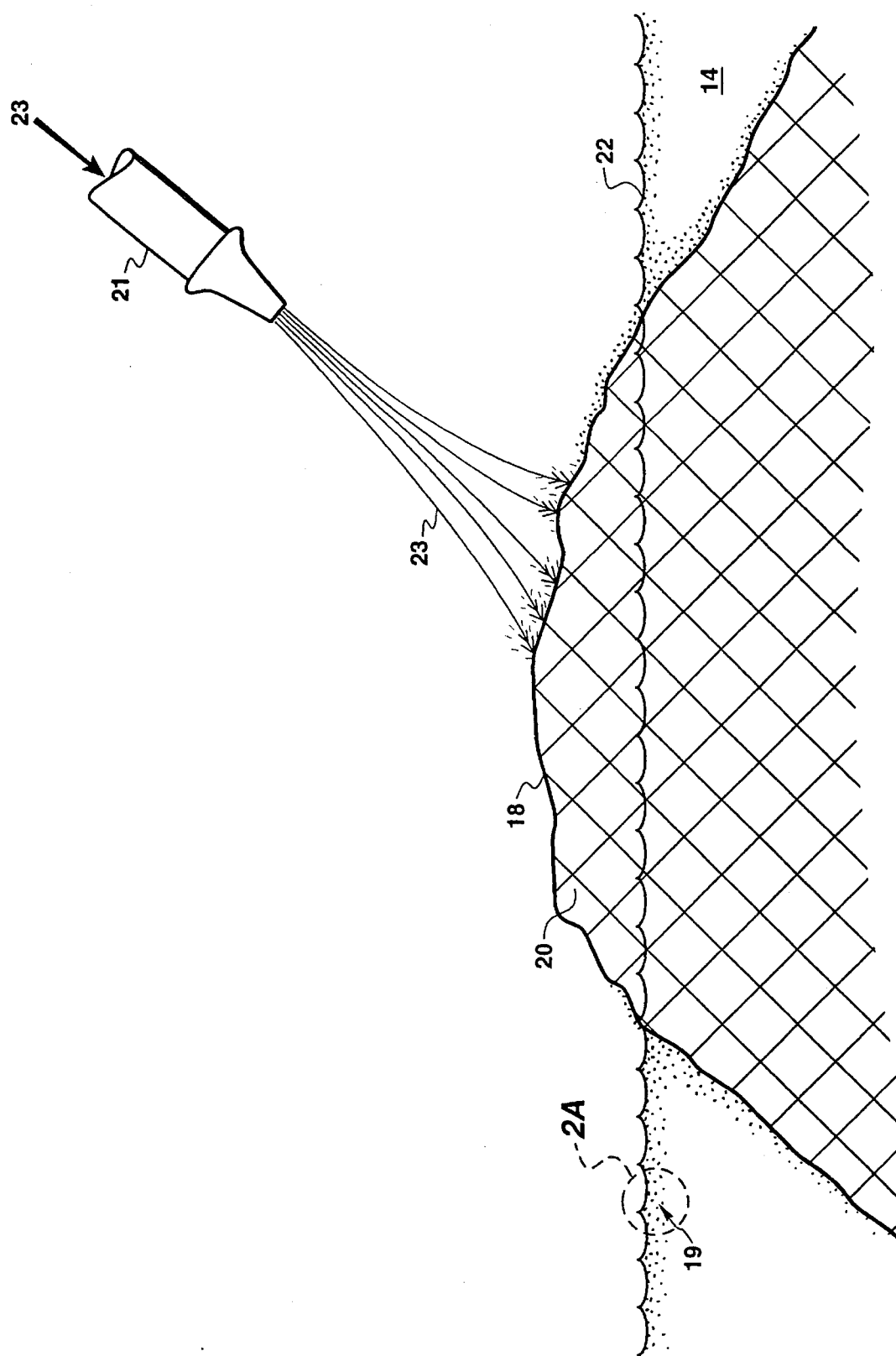
FIG. 2 illustrates a cross-sectional view of the shoreline rock after treatment of the oil film with the clay-oil flocculation process.

FIG. 2 illustrates a cross sectional view of the shoreline rock 20 at low tide after treatment of the oil film 11 on the rock's surface 18 with the clay-oil flocculation process. The clay-oil floccules 19 are formed on the rock's surface 18 after the oil film 11 is treated with the clay-oil flocculation process using a spray means 21 to apply a diluted mineral fines/water mixture 23 containing mineral fines dispersed in water. The clay-oil floccules 19 are more susceptible to being removed with the tidal action of the water 14 and the spray means 21 because the oil film 11 is substantially broken into nonadhering oil droplets 10 stabilized by mineral fines 12 (as shown in FIG. 2A).

Figure 2A:
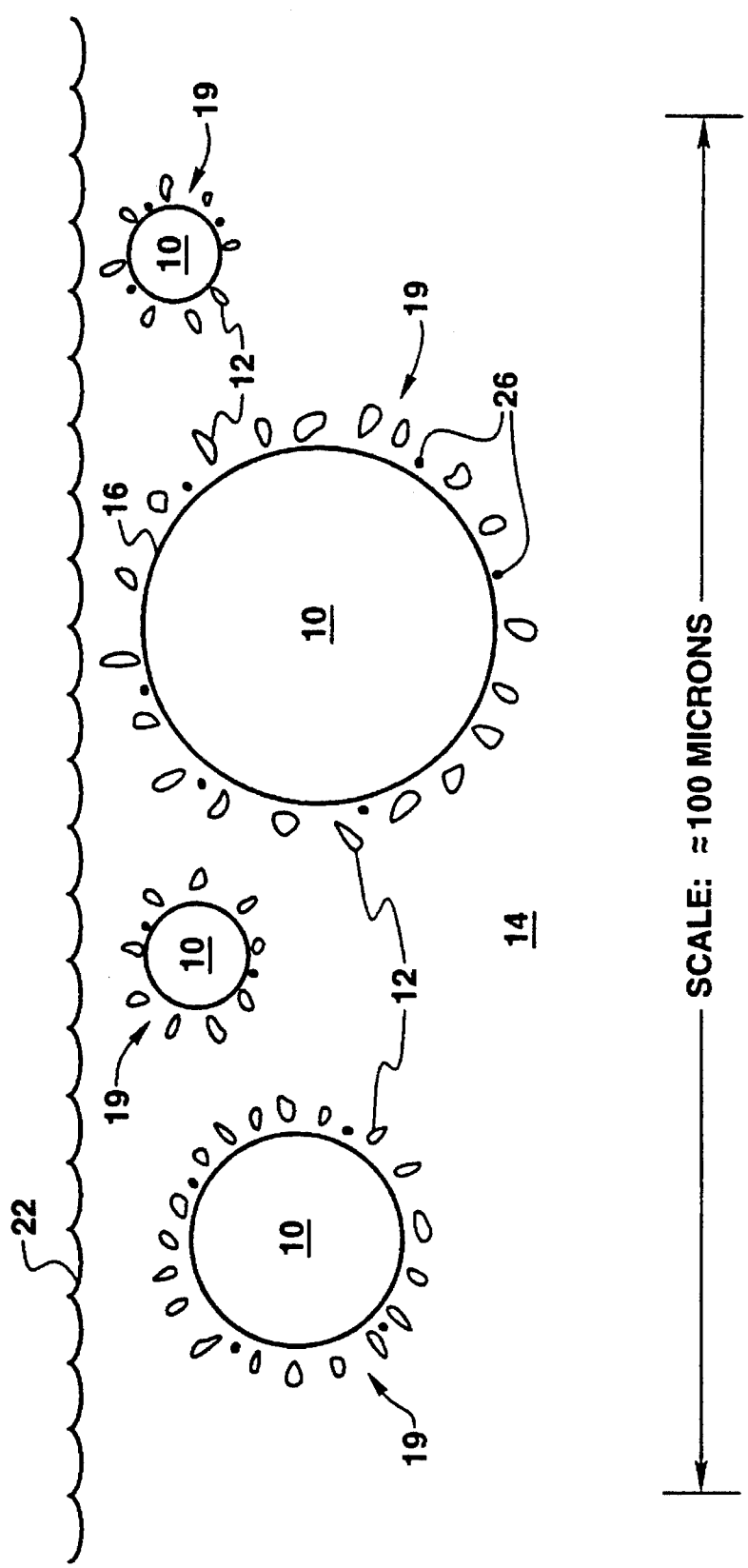
FIG. 2A illustrates a microscopic perspective of the clay-oil floccules suspended in water which were produced from the clay-oil flocculation process.

FIG. 2A is a small section of FIG. 2 taken from the water's surface 22. FIG. 2A illustrates a microscopic perspective of the clay-oil floccules 19 suspended in the water 14 resulting from the application of the clay-oil flocculation process and subsequent washing of the rock's surface 18 by tidal action or other washing means described in further detail below. FIG. 2A depicts how the oil droplets 10 remain substantially buoyant with a reduced tendency to recoalesce into an oil film 11 or to adhere to solid surfaces that are wet with water 14. Individual oil droplets 10 with a size of about 10 microns to about 200 microns mean diameter are each substantially surrounded by hydrophilic mineral fines 12 that are each substantially smaller in size than the oil droplet 10. The mineral fines 12 and oil droplets 10 are surrounded by and suspended in water 14 that may already be present at the treatment area or that has been sprayed for oil removal. The water 14 contains ions (not shown) which normally are present in seawater, including but not limited to, sodium, potassium, calcium, or chloride. The ionic strength of the water 14 must be sufficient to allow formation of substantially buoyant clay-oil floccules from the oil droplets 10 and the mineral fines 12.

Clay-oil flocculation occurs because polar hydrocarbon molecules (not shown) in the oil film 11 and oil droplets 10 possess electrical charges that attract electrical charges on ions dissolved in the water 14. These ions, in turn, are attracted simultaneously to the electrical charges on the the surface of the hydrophilic mineral fines 12. The ions in the water 14 thus balance out and stabilize the electrical attractions, maintaining an "ionic bridge" between the electrial charges on the mineral fines 12 and polar hydrocarbon molecules in the oil droplets 10. The mineral fines 12 do not actually touch the outer surface 16 of the oil droplet, but remain water wet and totally surrounded by the water 14.

In FIG. 2, recall that the oil film 11 has been removed from the surface 18 of the rock 20 following application of the clay-oil flocculation process. As shown in FIG. 2A, once flocculated with the mineral fines 12, the oil droplets 10 will no longer adhere to the rock's surface 18 because the adhesive bonding forces produced by the polar hydrocarbon molecules in the oil droplets 10 have been neutralized and stabilized by their attraction to the mineral fines 12. The oil droplets 10 will no longer coalesce provided they are flocculated with the mineral fines 12. The clay-oil floccules 19 comprising one or more individual oil droplets 10, associated mineral fines 12, and included water 14, are substantially buoyant and tend to float on or near the water's surface 22. The individual clay-oil floccules 19 may form weakly bound aggregates, the size and shape of which will depend on a number of factors such as the energy state of the water 14, but this aggregation will not affect the buoyancy of the clay-oil floccules or cause the removed oil droplets 10 to readhere to the solid rock surface 18.

In the case where the oil film 11 is present as a slick (not shown) on the water's surface 22, the same properties and principles discussed above apply. Consequently, where an oil slick is treated with the clay-oil flocculation process the individual clay-oil floccules 19 will not adhere strongly to solid surfaces wet with water and can be readily dispersed and diluted to a low concentration by natural waves, tides, winds, and currents.

Whether the the clay-oil flocculation process is applied to an oil film 11 on a rock's surface 18 or a water's surface 22, in a natural marine environment native hydrocarbon degrading microbes 26 will have increased access to the oil droplets 10 for biodegradation. This increased access arises because the cumulative oil-water interfacial area of the surface 16 of all oil droplets 10 is increased by up to several orders of magnitude relative to the oil-water interfacial area available with an oil film 11 prior to treatment.

Overview of the Preferred Embodiments

The clay-oil flocculation process can be used to remove or disperse oil adhering to solid surfaces such as shorelines, boat docks, or other solid substrates. It is also useful for dispersing oil floating as a free and separate phase on the surface of water in embayments, the open sea, or fresh water bodies, such as lakes or rivers. The various embodiments described herein and other embodiments which will become apparent to those skilled in the art may employ different methods for applying the mixture of mineral fines in water and achieving flocculation. The clay-oil flocculation process, however, that results in oil removal or dispersion is common to all applications where a substantially continuous oil film needs to be removed from a solid or liquid surface.

Applications to Solid Surfaces

Post-Spill Treatment

For removal of oil residues that have already become stranded on shorelines, the mixture of mineral fines dispersed in water may be sprayed on the oiled surfaces at high pressure. Subsequently, the flocculated oil may be washed to the waterline where it can be collected from the water surface by conventional processes such as booming and skimming.

Advanced Spill Mitigation

Where a spill has already occurred and it is anticipated that spilled oil will reach a shoreline but has not yet arrived, a mixture of mineral fines and water can be applied over the area where oil is expected to beach. This treatment will cause much or all of the oil reaching shore to flocculate with the mineral fines, and minimize the ability of the oil to adhere to solid shoreline sediments, thus mitigating efforts needed to later clean up the oil residues. This type of treatment is most effective where there is natural wave energy and/or tidal movement for contacting the mineral fines with the oil.

Applications to Water Surfaces

Benefits of Dispersing Oil Films

Oil floating on water as substantially continuous S oil films or "slicks" can be dispersed into discontinuous, discrete clay-oil floccules that will be naturally dispersed to lower and non-toxic concentrations by waves, winds, and currents through the application of mineral fines in water. The mixture of mineral fines suspended in water can be sprayed on the slick at a rate of application and concentration of mineral fines sufficient to cause the oil to flocculate and form substantially bouyant floccules. In this type application, the intent is to disperse the oil slick in a manner that will cause the oil to form small dispersed droplets that will not recoalesce and thereby can be naturally dispersed by waves, tides, winds and currents. Such a dispersion effect will reduce the local concentration of oil in the environment and consequently reduce any potential toxic effects to the environment which might otherwise arise. The advantages of this process for dispersing oil on water are that (1) the dispersing agent (i.e., the mineral fines) is non-toxic; (2) the clay-oil floccules will no longer remain coalesced and will have a reduced ability to adhere to solid surfaces and to wildlife such as birds or marine animals that may contact the oil; and (3) clay-oil flocculation increases the the rate of natural biodegradation and weathering of the oil by increasing the oil-water interfacial area for a given mass of oil as discussed above under the mechanistic description.

Application by Aerial Spraying

The mixture of mineral fines dispersed in water is sprayed on the oil slick by aerial spraying techniques such as those used to apply pesticides or fertilizer solutions to cultivated land or by other techniques apparent to those skilled in the art. Natural wave energy will cause oil droplet formation and subsequent dispersal of the oil film.

Application by Boat Spraying

A boat or motorized barge can be used to spray the mixture of mineral fines and water onto the surface of the oil slick. A low-pressure spray can be used to distribute the mixture as in aerial spray application, or the mixture can be sprayed under higher pressure as from a fire hose. The higher pressure method can be used where natural wave energy is low, such as in a protected embayment.

Process Parameters

A number of parameters can be adjusted in the clay-oil flocculation process to produce the desired interactions and oil droplet sizes that result in formation of substantially bouyant clay-oil floccules that have reduced adhesion on water-wet solid surfaces. Relevant process control parameters include the particle size distribution of the mineral fines, the ionic strength of the water used to apply the mineral fines to the oiled surface and/or of the water in the area of the oiled surface, the application pressure and temperature of the mineral fines-liquid mixture, the concentration of mineral fines in the mineral fines-liquid mixture, the concentration at which the mineral fine/liquid mixture is applied per unit area of oil. The desired parameters for producing substantially buoyant clay-oil floccules are partially application dependent, therefore each application may require different parameter values that in part are dependent on various conditions, such as, the viscosity and thickness of the oil film, the concentration of polar hydrocarbon molecules in the oil, the type of oiled surface being treated, density and particle size distribution of shoreline sediments (if any are present), and prevailing weather conditions. While the process is very tolerant of a wide range of combinations of process parameters, certain ranges of parameters will likely produce dersired results more quickly or more economically. Consequently, the most effective means for establishing the desired parameters is by means of an on-site evaluation procedure which will be described more fully below under the discussion of an example application for shoreline treatment. However, some general discussion will be presented with respect to treatment of an oil covered shoreline for purposes of providing an understanding of how the process parameters can affect the performance of the clay-oil flocculation process.

It is to be understood, however, that the process parameters are dependent on various conditions which may differ with each application of the clay-oil flocculation process. As a result, the discussion below is presented for brevity and only for purposes of understanding the principles of applying the process. Accordingly, the discussion should be considered for purposes of clarification and example without limiting the scope of the present invention.

For a given application, the combination of parameters can be varied and tested at the treatment location to determine which combination produces the desired rate of oil removal as substantially buoyant clay-oil floccules. For example, for a given range of spray pressure and amount of water sprayed on the spilled oil, the concentration of mineral fines in the sprayed water can be adjusted so that flocculation occurs among the oil droplets, mineral fines, and water to produce floccules that are stable over time and that contain individual oil droplets of sizes smaller than about 200 microns that do not coalesce to reform larger oil droplets and that have low or no adhesion to solid surfaces that are wet with water. The ratio of the mass of mineral fines to the mass of oil in these floccules should be sufficiently low that the floccules have a net density that is less than the water in which the floccules will be suspended for recovery or dispersion. Simple experimentation with different concentrations of mineral fines in the water sprayed with the pressure delivered by the spaying unit onto the actual oiled surface to be treated will show what range of concentrations are best.

The average particle size distribution of the mineral fines can also be evaluated by standard particle size analyzers well known to those skilled in the art. For example, a laser particle analyzer using a laser diffraction method provides one method for determining the mean diameter produced by the particle size distribution of the mineral fines which would be used in the process. Althougth the most effective mean particle diameter will vary depending on the application, the mineral fines used generally should have a mean particle diameter of about 10 microns or less. However, for many applications the mean particle diameter for the mineral fines should be about 2 microns or less.

In addition to the concentration and particle size distribution of mineral fines in the sprayed mineral fines-liquid mixture, the pressure of the sprayed mixture has a significant effect on the size of the resulting clay-oil floccules, with higher pressures producing smaller oil droplet sizes in the clay-oil floccules. The primary component, the mineral fines-liquid mixture must be water, however, other non-toxic liquids or dissolved solids could be used in conjunction with the aqueous liquid, such as liquids containing ions to supplement its ionic strength if the water is too fresh to produce adequate flocculation.

In general, the higher the oil viscosity, the higher is the pressure needed for effective formation of oil droplets. In most cases, a spray discharge pressure of 500 psi to 3000 psi is sufficient to produce the desired oil droplet size, but lower pressures may be sufficient. The lowest pressure that results in oil removal as substantially buoyant clay-oil floccules is desired in order to minimize forcing the removed oil into subsurface sediments where it is harder to float and recover. The amount of water sprayed per unit of surface to be cleaned needs to be sufficient to wash and float the removed oil floccules to the point of oil collection (usually at the shore waterline) where it can be recovered if desired. In some cases, the water needed to flush the flocculated oil to the point of collection may best be supplied from a source other than the high pressure spray used initially to distribute the water-mineral fines mixture and promote oil droplet formation. In such cases, the flush water may be supplied from a low pressure, high volume source appied simultaneously or after application of the high pressure spray.

Also, the ionic strength of the water containing mineral fines or the water surrounding the oil droplets should be sufficient to support formation of the clay-oil floccules. Preferably, the total ion concentration should be greater than about 1000 parts per million (ppm). However, certain applications may require more or less as other parameter conditions will vary. For instance, where the clay-oil flocculation process is applied to oil on rock in a fresh water area or on a fresh water surface, a total ion concentration required in the application mixture may be significantly greater than 1000 ppm. However, for any application on sea water or shorelines containing sea water, local seawater is the preferred water source.

Parameter Concentration Ranges

It should be understood that the desired flocculation of oil and mineral fines can be induced under a wide range of oil properties, a wide range of ratios of mineral fines to water and mineral fines to oil, and a wide variety of surfaces and amounts of oil per unit of oiled surface area. However, the preferred range of concentration of mineral fines in the mineral fines-water mixture applied to the oiled surface is about 0.1 g solids/l of water to 5 g solids/l of water. To produce flocculate oil that is substantially buoyant in water, the weight ratio of mineral fines to oil in the floc can be from 0.01 to about 0.10 or greater, depending on the densities of the oil and water. For example, a crude oil having a density of 0.9 g/ml and a viscosity of 28 cp flocculated effectively with seawater containing 0.25 g of montmorillonite/1 of water to form floccules that contained a of mass of mineral fines/mass of oil of about. 0.05. The resulting floccules were very buoyant, and rapidly rose to the surface of seawater. The size of the oil droplets in the floccules depend on the energy imparted during mixing of the water with the oil, but in simple bottle tests with gentle shaking by hand, this oil dispersed to form floccules containing oil droplets of about 10 microns to 30 microns in diameter. The floccules were stable over time and would not coalesce or adhere to water-wet solid surfaces.

The ease of flocculation depends on the concentration of polar molecules in the oil. Almost any crude oil or fuel oil, such as Bunker C or Number 6 fuel oil, will contain sufficient polar components to flocculate. If flocculation of refined oils such as mineral oils does not readily occur immediately after the oil is spilled, oxidation and weathering of the oil after a few days exposure usually produces sufficient polar hydrocarbons to permit flocculation.

While the above discussions are directed at removal of oil from a surface, such as the surface of rocks on a shoreline, this is not to be construed as limiting removal of oil only on the upper "surface" layer of rocks exposed on a shoreline. This process is also effective for removal of oil from the surfaces of sediments buried within a shoreline. For example, oil can be removed from oiled rocks located two feet deep within a shoreline. For oiled solids, the term surface means simply the interface between the impermeable solid and the fluid surrounding the solid. Thus, buried rocks containing oil residues may consist of many solid surfaces containing oil and surrounded by air or water, depending on whether the buried rocks were above or below the water level of the shoreline.

Also, mineral fines may be applied to a surface which may be affected by an oil spill. Upon reaching the treated surface the oil will then contact the mineral fines to form substantially buoyant mineral solids-oil floccules.

Example Application for Shoreline Treatment

Figure 3:
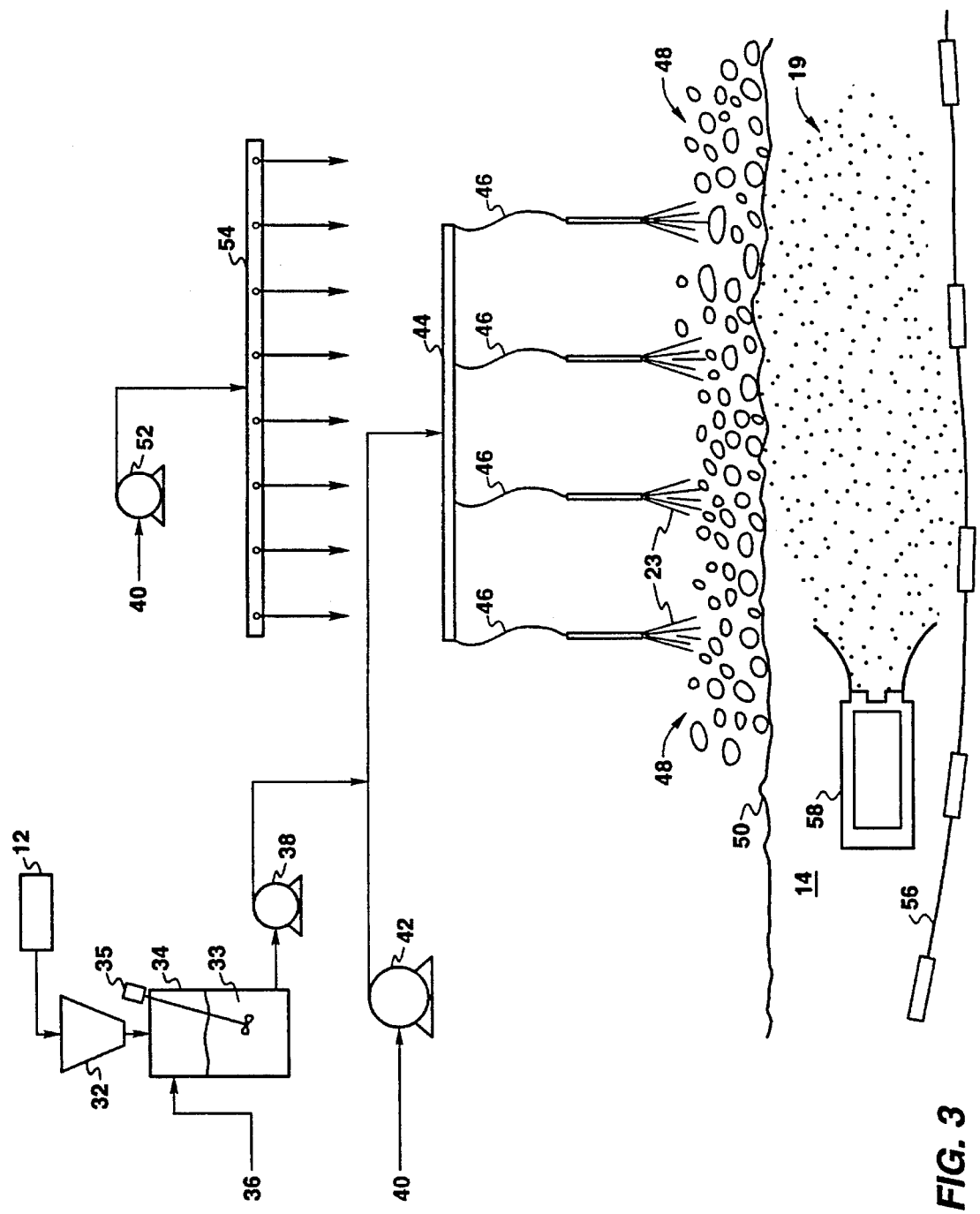
FIG. 3 illustrates a schematic depiction of the equipments used to support the clay-oil flocculation process and an aerial view of a shoreline undergoing treatment by the process.

The present invention for removing oil from surfaces will be be described and illustrated. More specifically, an example application of the process for removing oil residues from surfaces of rocks on shoreline will be described. FIG. 3 illustrates a typical application of the clay-oil flocculation process for this application.

FIG. 3 illustrates how the process is applied to remove and recover oil from a rocky shoreline covered with an oil. Mineral fines 12 of the desired size and mineral composition are delivered to the spill site. Depending on the size of the cleanup effort and equipment used, the solid mineral fines may be delivered in bags or in bulk that can be conveyed by manual, mechanical, pnuematic or hydraulic means. The solid particles can be of wide mineral composition, and can consist of: clays such as illite, montmorillonite, or kaolinite, quartz particles, feldspar particles, or mixtures of these such as are commonly found in glacial flour (a common name for fine mineral particles or mineral fines formed from glacial erosion and present in glacial meltwater or in submarine deposits offshore from glaciers). Although mineral fines of wide composition can be employed, clays such as illite are preferred because they possess a higher surface area per unit of mass and a higher electrical charge density than more dense minerals such as quartz. The mineral fines should be presized to ensure that substantially all of the hydrated particles will pass through a 500 mesh screen (i.e., each particle will pass a mesh opening of about 31 microns or less), and preferably provide an average particle size distribution which will produce a mean diameter of about 2 microns or less. The particles can be presized by washing in an elutration sizing system that rejects all particles larger than a desired size. Alternately, a source of naturally presized mineral fines can be obtained by underwater extraction of offshore marine sediments such as an offshore delta where the natual settling velocity of the particles in water allows accumulation of only mineral fines having a mean diameter of about 2 microns or less.

The mineral fines 12 are placed into a mechanical hopper 32 that feeds them into a slurry tank 34 equipped with a mixing means 35 where they are hydrated in a slurry mixture 33 comprising mineral fines 12 and water 36. The concentration of mineral fines 12 in the slurry tank 34 can be in any range that provides for complete hydration and dispersion of the mineral fines in the water 36 but allows for easy mixing and pumping of the slurry mixture 33. A convenient concentration of mineral fines is approximately 1–5% by weight of mineral fines 12 in water 36.

The water 36 for slurry mixing and for the primary water source 40, should contain sufficient ions to allow the formation of substantially buoyant clay-oil floccules. Any seawater or brackish marine water already contains sufficient ions to produce such flocculation, and these local waters are the preferred water source for cleaning marine shorelines. Ordinary seawater contains about 3.2 wt % of dissolved salts, far more than the minimum needed to cause flocculation. If the ionic content of the water 36 is less than about 0.1 wt % (1000 ppm by weight), then salt (not shown) may need to be added to the water to bring its ionic strength to a level sufficient to allow formation of substantially buoyant clay-oil floccules. As discussed above, the exact minimum total ion concentration of the water needed can be determined by simple tests conducted in bottles. In these tests, about 200 ml of the mineral fines-water mixture and about 5–10 drops of the oil to be treated are added to the bottle and the contents are shaken by hand for about one minute. The bottle is then inspected for presence of flocculated oil. A series of bottle tests in which levels of ion concentration in the water mixed with the mineral fines and oil residue can be used to determine the minimum needed ion concentration. The sample bottle with the lowest total ion concentration which exhibits the formation of substantially buoyant clay-oil floccules establishes the the minimum total ion concentration needed to produce such flocculation. Typically, however, such tests will usually not be needed when the water is from a marine environment The primary water source 40 is pumped to necessary spraying pressure by means of pump 42. The concentration of mineral fines 12 in the water sprayed on the oiled shoreline is controlled by varying the rate of the variable speed metering pump 38 and the primary supply pump 42. The mineral fines-water slurry mixture 33 is thereby mixed with water from the primary water source 40 to yield the desired net concentration of mineral fines to produce a diluted mineral fines/water mixture 23. This diluted mineral fines/water mixture 23 distributed to individual spraying units 46 by means of manifold 44. The diluted mineral fines/water mixture 23 is sprayed on the oiled shoreline 48, causing the oil to form droplets 10, and produce substantially buoyant clay-oil floccules 19, as shown in FIG. 2A. The flocculated oil is washed down the shoreline 48 to the water line 50, where the flocculated oil will float on the water 14.

Additionally, additional water for washing the flocculated oil to the waterline can be supplied by a low-pressure, high-volume pump 52 that discharges water through a perforated pipe or hose 54 located at a higher elevation above the treated area of the shoreline 48. If desired, once the flocculated oil is washed to the waterline, the oil floccules can be prevented from escaping by employing an oil boom 56, and then the flocculated oil can be skimmed from the water surface by conventional skimmer barge 58. If desired, the skimmed flocculated oil can be treated to break its emulsion structure and facilitate separating the oil from the associated water and mineral fines in the following manner. The oil floccules 19 and excess water collected by the skimmer barge 58 are placed into a temporary emulsion storage tank (not shown). Chemical agents that disrupt the balance of electrical charges among the oil, mineral fines, and water can be added to the temporary emulsion storage tank to cause the floccule structure to break and separate into larger coalesced oil droplets, separated mineral fines, and water. Chemical agents that can be used effectively include surfactants, acids, bases, or other emulsion breaking chemicals.

The preferred embodiments of practicing the invention have been described. It should be understood that the foregoing is illustrative only and that other means and techniques can be employed without departing from the true scope of the invention defined in the following claims.

What we claim is:

1. A method for removing oil from a solid surface, said method comprising:
   (a) dispersing solid particles consisting essentially of hydrophilic mineral particles having a mean particle diameter of about 10 microns or less in an aqueous liquid, to form a liquid-mineral particle dispersion, said liquid having sufficient ionic strength which will allow formation of substantially buoyant and dispersible stabilized mineral solids-oil floccules wherein said particles remain substantially hydrophilic;
   (b) contacting said oil with said liquid-mineral particle dispersion under conditions allowing discrete oil droplets to form from said oil;
   (c) forming said hydrophilic and dispersible stabilized mineral solids-oil floccules that are substantially buoyant; and
   (d) removing said stabilized mineral solids-oil floccules from said solid surface with water.

2. The method of claim 1 wherein said mineral solid particles are selected from the group consisting of clay, quartz, and feldspar.

3. The method of claim 1 wherein said aqueous liquid is comprised of water and one or more salts.

4. The method of claim 1 wherein said contacting step is performed with energy imparted on said surface by a pressurized spray of said liquid-mineral particle dispersion.

5. The method of claim 1 further comprising recovering said stabilized mineral solids-oil floccules in a receptacle and adding a chemical substance which breaks said mineral solids-oil floccules into said oil, water, and mineral solids.

6. The method of claim 5 wherein said chemical substance is a surfactant.

7. The method of claim 5 wherein said chemical substance is an acid.

8. The method of claim 5 wherein said chemical substance is a base.

9. The method of claim 5 further comprising separating said oil from said water and said mineral solids and recovering said oil.

10. A method for dispersing oil on a water surface, said method comprising:
    (a) dispersing solid particles consisting essentially of hydrophilic mineral particles having a mean particle diameter of about 10 microns or less in an aqueous liquid, to form a liquid-mineral particle dispersion, said liquid having sufficient ionic strength which will allow formation of substantially buoyant and dispersible stabilized mineral solids-oil floccules wherein said particles remain substantially hydrophilic;
    (b) contacting said oil with said liquid-mineral particle dispersion under conditions allowing discrete oil droplets to form from said oil;
    (c) forming said hydrophilic and dispersible stabilized mineral solids-oil floccules that are substantially buoyant; and
    (d) allowing said stabilized mineral solids-oil floccules to disperse over said water surface.

11. The method of claim 10 wherein said mineral solid particles are selected from the group consisting of clay, quartz, and feldspar.

12. The method of claim 10 wherein said oil is on a water surface selected from the group consisting of sea water and fresh water.

13. The method of claim 10 wherein said aqueous liquid is comprised of water and one or more salts.

14. The method of claim 10 wherein said contacting step is performed with energy imparted on said surface by a pressurized spray of said liquid-mineral particle dispersion.

15. The method of claim 10 further comprising recovering said stabilized mineral solids-oil floccules in a receptacle and adding a chemical substance which breaks said mineral solids-oil floccules into said oil, water, and mineral solids.

16. The method of claim 15 wherein said chemical substance is a surfactant.

17. The method of claim 15 wherein said chemical substance is an acid.

18. The method of claim 15 wherein said chemical substance is a base.

19. The method of claim 15 further comprising separating said oil from said water and said mineral solids and recovering said oil.

* * * * *